US010138965B2

(12) United States Patent
Kaneda et al.

(10) Patent No.: US 10,138,965 B2
(45) Date of Patent: Nov. 27, 2018

(54) DISK BRAKE

(71) Applicant: HITACHI AUTOMOTIVE SYSTEMS, LTD., Ibaraki (JP)

(72) Inventors: Takeru Kaneda, Minamiarupusu (JP); Kazumoto Sano, Yamanashi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/513,763

(22) PCT Filed: Dec. 25, 2015

(86) PCT No.: PCT/JP2015/086193
§ 371 (c)(1),
(2) Date: Mar. 23, 2017

(87) PCT Pub. No.: WO2016/104687
PCT Pub. Date: Jun. 30, 2016

(65) Prior Publication Data
US 2017/0297434 A1    Oct. 19, 2017

(30) Foreign Application Priority Data

Dec. 26, 2014  (JP) ................................. 2014-265016

(51) Int. Cl.
*F16D 65/18*  (2006.01)
*B60T 13/74*  (2006.01)
(Continued)

(52) U.S. Cl.
CPC ............ *F16D 65/18* (2013.01); *B60T 13/741* (2013.01); *B60T 13/746* (2013.01); *F16D 55/22* (2013.01);
(Continued)

(58) Field of Classification Search
CPC ...... F16D 55/22; F16D 65/18; F16D 2121/24; H01R 24/20; H01R 13/20; H01R 13/26;
(Continued)

(56) References Cited

U.S. PATENT DOCUMENTS 1,662,822 A  *  3/1928  Dunne .................. H01R 4/029
                                                    403/230
2,591,009 A  *  4/1952  Riche .................. H01R 13/115
                                                    24/704.1
(Continued)

FOREIGN PATENT DOCUMENTS

JP           63-126185        5/1988
JP           8-64262          3/1996
(Continued)

OTHER PUBLICATIONS

International Search Report dated Apr. 5, 2016 in International Application No. PCT/JP2015/086193.

*Primary Examiner* — Thomas J Williams
(74) *Attorney, Agent, or Firm* — Wenderoth, Lind & Ponack, L.L.P.

(57) ABSTRACT

A disk brake allowing a connector terminal (255) and a joining terminal (256) to be easily positioned in a width direction thereof and a direction toward an opening portion of a housing, because the joining terminal fixed to one end of a harness includes individual protruding portions (265) and a pair of biasing portions (264). Further, due to each of the biasing portions, the connector terminal and the joining terminal can be brought into close contact with each other. Further, due to the protruding portions of the joining terminal, an end (258A) of the connector terminal and an end (268A) of a contact surface portion (263) can be brought into alignment with each other, which facilitates formation of such a welded portion (266) that extends over the respective (Continued)

ends, and thus achieves a secure connection between the connector terminal and the joining terminal.

8 Claims, 8 Drawing Sheets

(51) Int. Cl.

| | |
|---|---|
| *H01R 13/26* | (2006.01) |
| *F16D 55/22* | (2006.01) |
| *F16D 55/226* | (2006.01) |
| *H01R 4/02* | (2006.01) |
| *F16D 121/24* | (2012.01) |
| *F16D 125/40* | (2012.01) |
| *F16D 125/48* | (2012.01) |
| *F16D 125/50* | (2012.01) |

(52) U.S. Cl.
CPC ......... *F16D 55/226* (2013.01); *F16D 65/183* (2013.01); *H01R 4/023* (2013.01); *H01R 13/26* (2013.01); *F16D 2121/24* (2013.01); *F16D 2125/40* (2013.01); *F16D 2125/48* (2013.01); *F16D 2125/50* (2013.01); *F16D 2250/0084* (2013.01)

(58) Field of Classification Search
CPC .... H01R 13/28; H01R 13/629; H01R 13/639; H01R 13/113; H01R 13/114; H01R 13/115; H01R 13/02; H01R 13/04; H01R 13/22; B60T 13/741; B60T 13/746
USPC ............................... 439/842–859, 295, 796
See application file for complete search history.

(56) References Cited

U.S. PATENT DOCUMENTS

| | | | | |
|---|---|---|---|---|
| 2,738,485 | A | * | 3/1956 | Batcheller ............ H01R 13/115 439/849 |
| 4,552,425 | A | * | 11/1985 | Billman ................. H01R 13/28 439/295 |
| 6,099,366 | A | | 8/2000 | Shinchi |
| 2006/0003610 | A1 | | 1/2006 | Watanabe et al. |
| 2006/0205289 | A1 | | 9/2006 | Kumakura |
| 2012/0325601 | A1 | * | 12/2012 | Giering ............... F16D 65/0006 188/162 |
| 2014/0034430 | A1 | | 2/2014 | Fuse et al. |

FOREIGN PATENT DOCUMENTS

| | | |
|---|---|---|
| JP | 10-334960 | 12/1998 |
| JP | 2006-19074 | 1/2006 |
| JP | 2006-269150 | 10/2006 |
| JP | 2006-283822 | 10/2006 |
| JP | 2014-29193 | 2/2014 |

\* cited by examiner (a)  (b)

DISK BRAKE

TECHNICAL FIELD

The present invention relates to a disk brake for use in braking of a vehicle.

BACKGROUND ART

Some of conventional disk brakes include a parking brake mechanism configured to be activated by an electric motor when, for example, a parking brake is applied (refer to PTL 1).

CITATION LIST

Patent Literature

PTL 1: Japanese Patent Application Public Disclosure No. 2014-29193

SUMMARY OF INVENTION

Technical Problem

In a disk brake discussed in PTL 1, a connector terminal and a joining terminal of a motor wiring are joined to each other by elastic coupling, which may make a supply of electric power to the electric motor instable due to a vibration when a vehicle is running.

Therefore, an object of the present invention is to provide a disk brake capable of stably supplying the electric power to the electric motor.

Solution to Problem

As a solution to achieve the above-described object, according to an aspect of the present invention, a disk brake includes a motor configured to activate a rotation-linear motion conversion mechanism contained in a caliper to displace a piston, and a housing attached to the caliper and containing the motor therein. The housing also includes an opening portion closed by a cover member. A connector terminal is fixed in this housing. The connector terminal includes a distal end extending toward the opening portion and is formed into a plate-like shape having a flat plate surface. The connector terminal is used to supply power to the motor. A wiring connecting this connector terminal and the motor is provided. A joining terminal joined to the connector terminal is provided at one end of this wiring. This joining terminal includes a fixation portion to which the one end of the wiring is fixed, a contact surface portion extending from this fixation portion and facing the flat plate surface of the connector terminal, a biasing portion extending from a side of the contact surface portion to a back surface of the flat plate surface of the connector terminal and configured to bias the contact surface portion so as to bring the contact surface portion into close contact with the connector terminal, a protruding portion provided at a position of the contact surface portion that is separated from this biasing portion and disposed in such a manner that an end of the connector terminal on one side thereof closer to the opening portion and an end of the contact surface portion on one side thereof closer to the opening portion are in alignment with each other when the protruding portion is in abutment with the connector terminal, and a welded portion formed so as to extend over the end of the connector terminal on the one side thereof closer to the opening portion and the end of the contact surface portion on the one side thereof closer to the opening portion.

Advantageous Effects of Invention

According to the disk brake of the present invention, the electric power can be stably supplied to the electric motor.

DESCRIPTION OF EMBODIMENTS

In the following description, embodiments of the present invention will be described in detail with reference to FIGS. 1 to 12.

Figure 1:
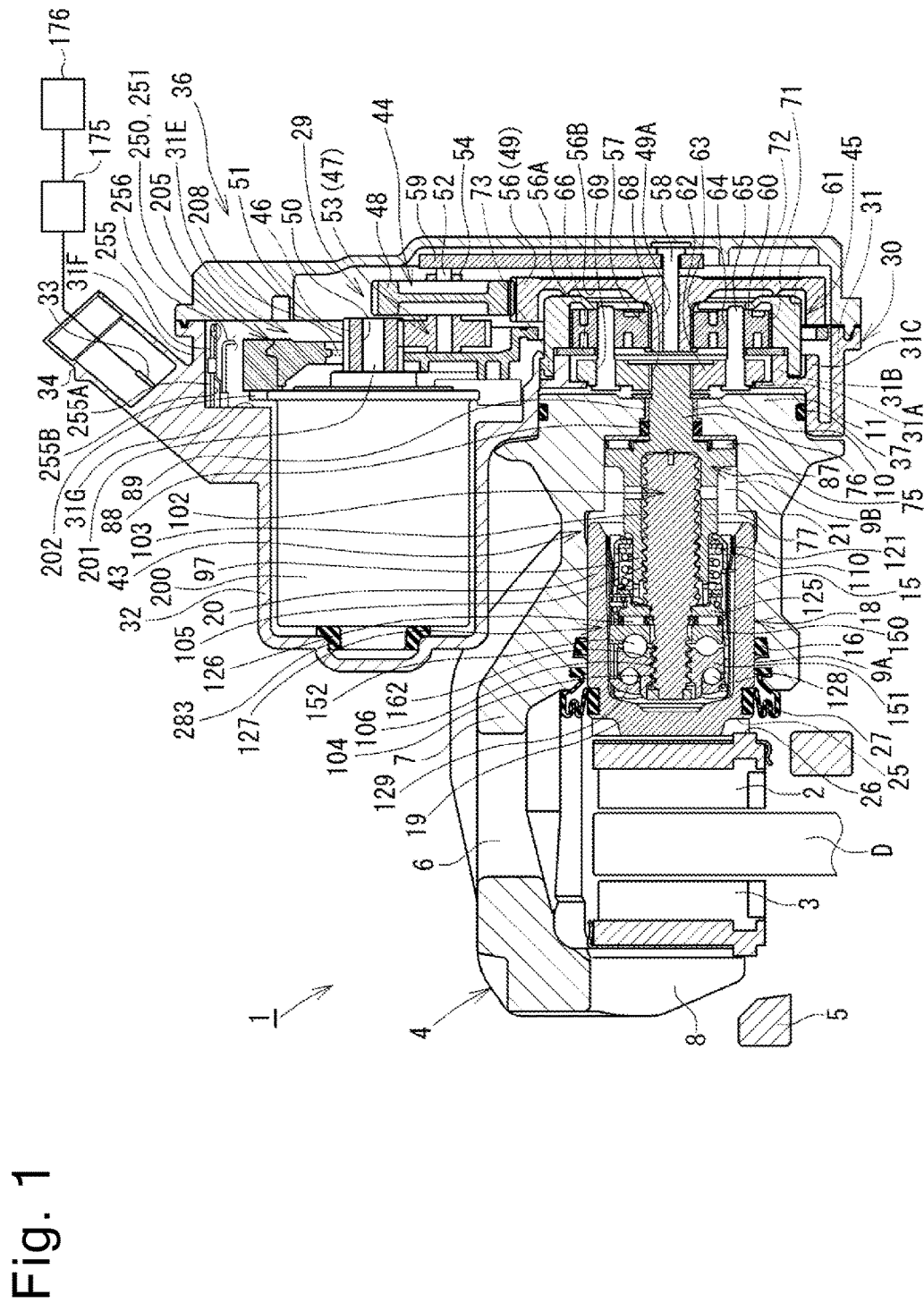
FIG. 1 is a cross-sectional view illustrating a disk brake according to an embodiment.

As illustrated in FIG. 1, a pair of inner and outer brake pads 2 and 3, and a caliper 4 are provided at a disk brake 1 according to the present embodiments. The pair of inner and outer brake pads 2 and 3 is disposed on both axial sides of a disk rotor D mounted at a rotatable portion of a vehicle. The present disk brake 1 is configured as a floating caliper-type disk brake. The pair of inner and out brake pads 2 and 3, and the caliper 4 are supported on a bracket 5 fixed to a non-rotatable portion of the vehicle, such as a knuckle, displaceably in an axial direction of the disk rotor D. In the following description, the present disk brake 1 will be described assuming that a right side and a left side in FIG. 1 are one end side and an opposite end side, respectively, when necessary for convenience of the description.

As illustrated in FIGS. 1 to 6, a caliper main body 6, which is a main body of the caliper 4 includes a cylinder portion 7 and a claw portion 8. The cylinder portion 7 is positioned on a proximal end side facing the inner brake pad 2 in an inner side of the vehicle. The claw portion 8 is positioned on a distal end side facing the outer brake pad 3 in an outer side of the vehicle. A bottomed cylinder 15 is formed in the cylinder portion 7. The cylinder 15 is opened on an inner brake pad 2 side thereof to form a large-diameter opening portion 9A, and is closed on an opposite side therefrom by a bottom wall 11 including a hole portion 10. A small-diameter opening portion 9B is formed on a bottom wall 11 side in the cylinder 15. The small-diameter opening portion 9B is provided continuously from the large-diameter opening portion 9A and is smaller in diameter than this large-diameter opening portion 9A. A piston seal 16 is provided in the cylinder 15 on an inner peripheral surface of the large-diameter opening portion 9A thereof.

A piston 18 is formed into a bottomed cup-like shape including a bottom portion 19 and a cylindrical portion 20. The piston 18 is contained in the cylinder 15 in such a manner that the bottom portion 19 thereof faces the inner brake pad 2. The piston 18 is mounted in the large-diameter opening portion 9A of the cylinder 15 axially displaceably while being in contact with the piston seal 16. A space between this piston 18 and the bottom wall 11 of the cylinder 15 is defined as a hydraulic chamber 21 by the piston seal 16. The disk brake 1 is configured in such a manner that a hydraulic pressure is supplied from a not-illustrated hydraulic source, such as a master cylinder and a hydraulic control unit, into this hydraulic chamber 21 via a not-illustrated port provided at the cylinder portion 7.

A plurality of rotation regulation vertical grooves (refer to FIG. 6) is formed on an inner peripheral surface of the piston 18 along a circumferential direction. A recessed portion 25 is provided on an outer peripheral side of an opposite end surface of the bottom portion 19 of the piston 18 that faces the inner brake pad 2. This recessed portion 25 is engaged with a protruding portion 26 formed on a back surface of the inner brake pad 2. By this engagement, the piston 18 is regulated so as to be prohibited from rotating relative to the cylinder 15 and thus the caliper main body 6. Further, a dust boot 27 is interposed between an outer peripheral surface of the piston 18 on the bottom portion 19 side and an inner peripheral surface of the large-diameter opening portion 9A of the cylinder 15. The dust boot 27 prevents a foreign object from entering this cylinder 15.

Figure 2:
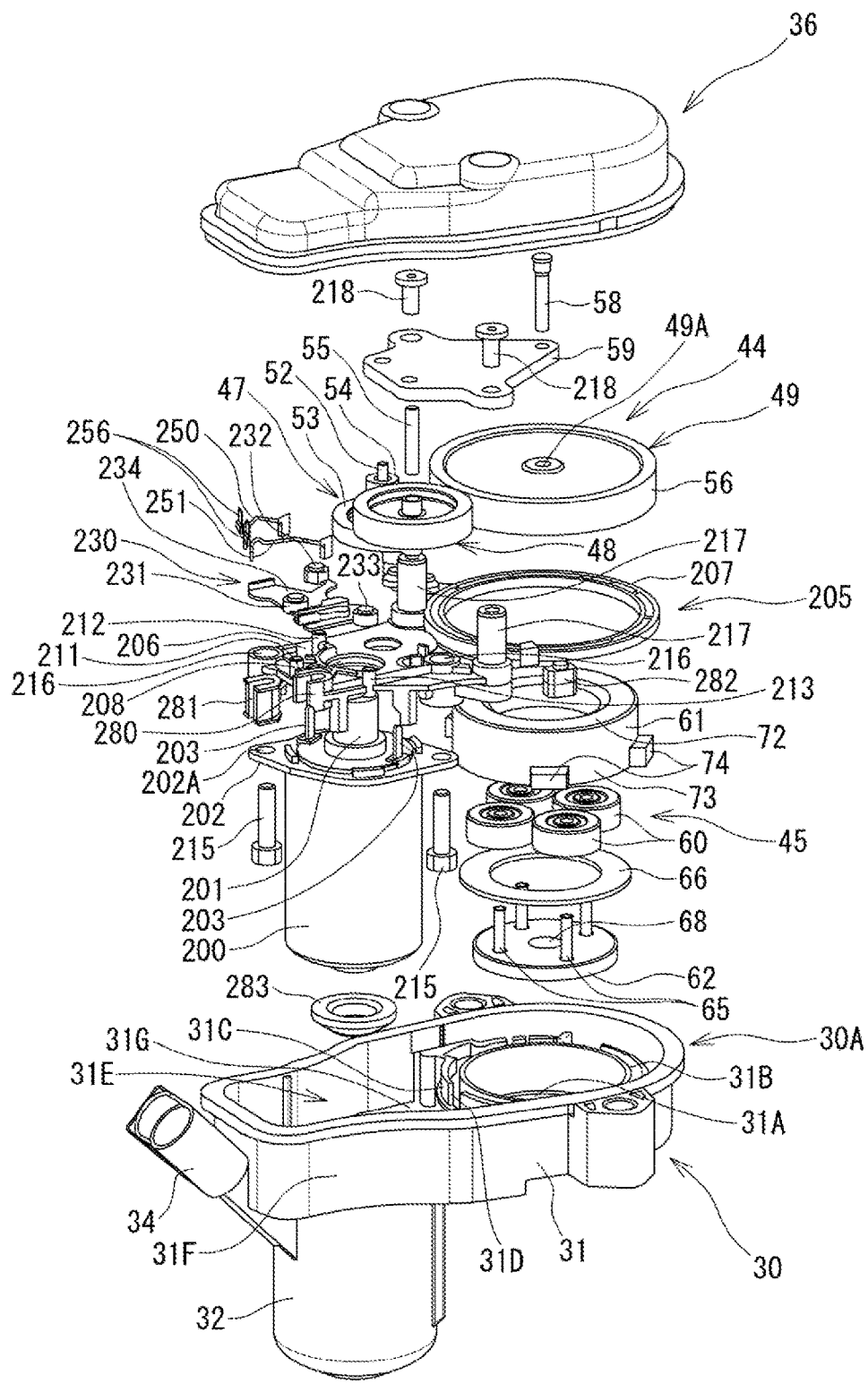
FIG. 2 is an exploded perspective view of an inside of a housing.
Figure 3:
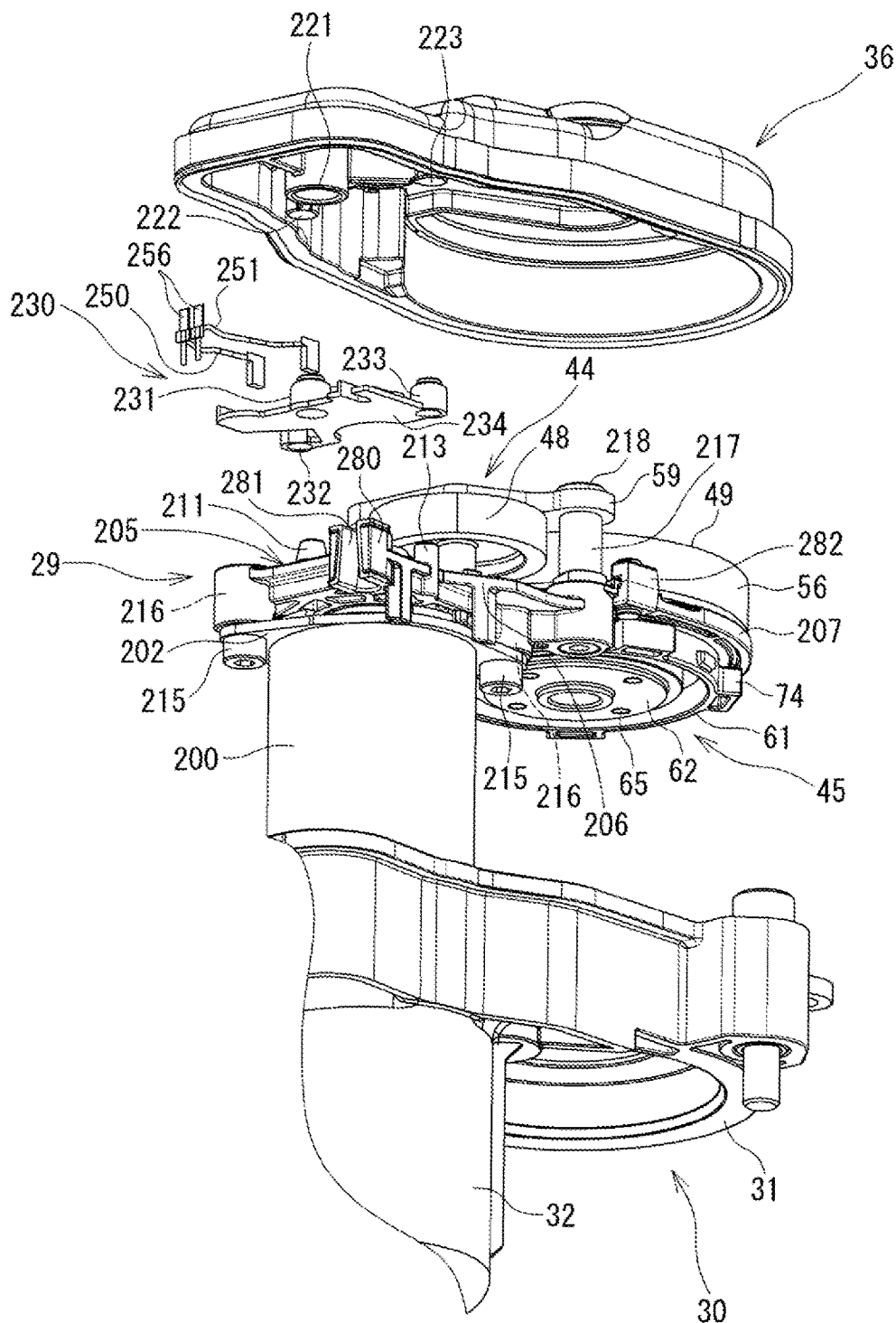
FIG. 3 is an exploded perspective view of the inside of the housing.

As illustrated in FIGS. 1 to 3, a housing 30 is attached to one side of the caliper main body 6 where the bottom wall 11 of the cylinder 15 is located. A motor gear assembly 29 is contained in the housing 30. An opening portion 30A is provided at one end of the housing 30. A cover 36 (a cover member) is attached to this opening portion 30A. The cover 36 air-tightly closes the opening portion 30A. In other words, the opening portion 30A of the housing 30 is closed by the cover 36 (the cover member). A seal member 37 is provided between the housing 30 and the cylinder portion 7. Air-tightness is maintained in the housing 30 by this seal member 37. The housing 30 includes a first housing portion 31 and a second housing portion 32 so as to cover an outer periphery of the bottom wall 11 of the cylinder 15. The first housing portion 31 contains therein a multi-stage spur reduction mechanism 44 and a planetary gear reduction mechanism 45, which will be described below. The second housing portion 32 is integrally provided in a protruding manner from the first housing 31 so as to have a bottomed cylindrical shape, and contains a motor 200 therein. In this manner, the housing 30 is configured to contain therein the motor 200 disposed so as to be laid out beside the caliper main body 6 by the bottomed cylindrical second housing portion 32. The first housing portion 31 includes an outer wall portion 31F and a bottom surface portion 31G, an attachment opening portion 31A, an inner annular wall portion 31B, an outer annular wall portion 31C, and a plurality of engagement grooves 31D. The outer wall portion 31F and the bottom surface portion 31G surround a containing chamber 31E that contains therein the multi-stage spur reduction mechanism 44 and the planetary gear reduction mechanism 45, which will be described below, in cooperation with the cover 36. The attachment opening portion 31A contains therein a part of the bottom wall 11 of the cylinder 15. A polygonal shaft portion 81 of a base nut 75 of a rotation-linear motion conversion mechanism 43, which will be described below, is inserted through the attachment opening portion 31A. The inner annular wall portion 31B is provided in a protruding manner around the attachment opening portion 31A. The outer annular wall portion 31C is provided in a protruding manner while being radially outwardly spaced apart from this inner annular wall portion 31B. The plurality of engagement grooves 31D is formed at intervals in a circumferential direction of this outer annular wall portion 31C (refer to FIG. 2).

Figure 4:
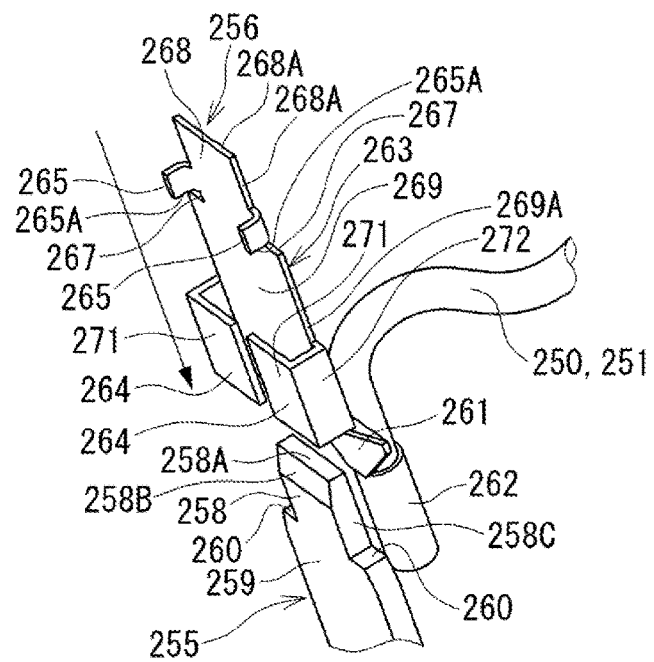
FIG. 4 is a perspective view illustrating how a joining terminal is attached to a connector terminal according to a first embodiment.
Figure 5:
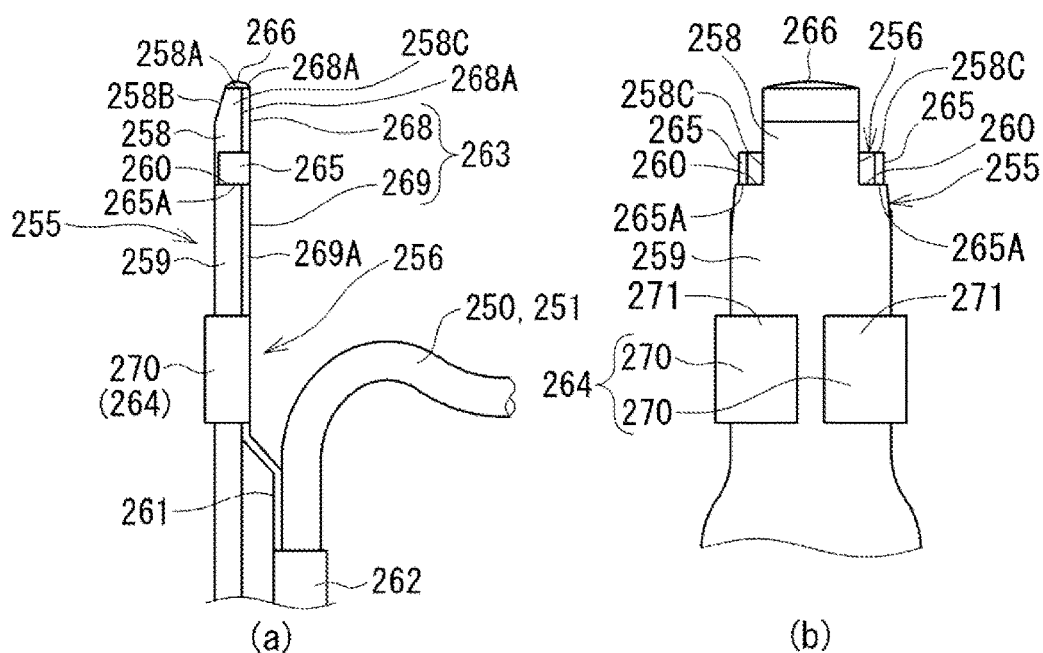
FIG. 5(a) is a side view illustrating the connector terminal and the joining terminal when the joining terminal is attached to the connector terminal according to the first embodiment.
FIG. 5(b) is a front view illustrating the connector terminal and the joining terminal when the joining terminal is attached to the connector terminal according to the first embodiment

As illustrated in FIG. 1, a connector portion 34 is integrally provided in a protruding manner so as to extend over the first housing portion 31 and the second housing portion 32. The connector portion 34 includes two connection terminals 33 therein. These individual connection terminals 33 are electrically connected to individual connector terminals 25 disposed in the first housing 31, respectively. Each of the connector terminals 255 is disposed close to the outer wall portion 31F on a connector portion 34 side in the first housing portion 31. Each of the connector terminals 255 extends toward the opening portion 30A of the housing 30. More specifically, the individual connection terminals 33 and the individual connector terminals 255 are each prepared as a single metallic wire, and are molded to the housing 30. Then, the single metallic wire for each of the connection terminals 33 and the connector terminals 255 has one end serving as the connection terminal 33 protruding in the connector portion 34 and an opposite end serving as the connector terminal 255 extending from the bottom surface portion 31G of the housing portion 31 toward the opening portion 30A. As illustrated in FIGS. 4 and 5, each of the connector terminals 255 is formed into a plate-like shape. Each of the connector terminals 255 is integrally formed by a narrow portion 258 and a wide portion 259. The narrow portion 258 is located on the opening portion 30A side. The wide portion 259 is provided continuously from the narrow portion 258 toward the motor 200 side. The narrow portion 258 and the wide portion 259 are each formed into a generally rectangular shape as viewed from a front surface. In the above description, the front surface refers to a surface where each of the connector terminal 255 and a joining terminal 256, which will be described below, are in abutment with each other, and the shape as viewed from the front surface means a shape as viewed from a front surface of the connector terminal 255. The narrow portion 258 and the wide portion 259 have approximately equal thicknesses. Stepped surfaces 260 are formed between the narrow portion 258 and the wide portion 259 on both side surfaces 258C of each of the connector terminals 255, respectively. A guide tapered surface 258B is formed at the narrow portion 258 of each of the connector terminals 255 on a surface opposite from the joining terminal 256 side on one side closer to the opening portion 30A of the housing 30. A thickness of the guide tapered surface 258B is reducing toward an end 258A. In the present embodiment, a surface of the connector terminal 255 on one side closer to the outer wall portion 31F serves as a wall-side flat surface 255A, and an opposite side from this wall-side flat surface 255A serves as a flat plate surface 255B in close contact with a contact surface portion 263 of the joining terminal 256, which will be described below. The wall-side flat surface 255A corresponds to a back surface of the flat plate surface, if the front side and the back side are determined based on the flat plate surface 255B.

As illustrated in FIG. 1, the caliper main body 6 includes the multi-stage spur reduction mechanism 44 and the planetary gear reduction mechanism 45, and the rotation-linear motion conversion mechanism 43. The multi-stage spur reduction mechanism 44 and the planetary gear reduction mechanism 45 enhance a driving force output from the motor 200. The rotation-linear motion conversion mechanism 43 advances the piston 18 and also holds the advanced piston at a braking position. The multi-stage spur reduction mechanism 44 and the planetary gear reduction mechanism 45 as a reduction mechanism are contained in the containing chamber 31E, which is located inside the first housing 31 of the housing 30.

As illustrated in FIGS. 1 to 3, the multi-stage spur reduction mechanism 44 includes a pinion gear 46, a first reduction gear 47, a non-reduction spur gear 48, and a second reduction gear 49. The first reduction gear 47, the non-reduction spur gear 48, and the second reduction gear 49 are made from metal, or resin such as fiber-reinforced resin.

The pinion gear 46 is cylindrically formed, and includes a hole portion 50 and a gear 51. The hole portion 50 is fixedly press-fitted to a rotational shaft 201 of the motor 200. The gear 51 is formed on an outer periphery. The first reduction gear 47 includes a large-diameter large gear 53 and a small-diameter small gear 54, which are formed integrally with each other. The large gear 53 is meshed with a gear 51 of the pinion gear 46. The small gear 54 is formed so as to axially extend from the large gear 53. The first reduction gear 47 is supported by a shaft 52 rotatably relative to a support plate 59 and a holder 205, which will be described below. This shaft 52 is supported at one end thereof by the support plate 59 located close to the cover 36, and at an opposite end thereof by the holder 205.

The small gear 54 of the first reduction gear 47 is meshed with the non-reduction spur gear 48. The non-reduction spur gear 48 is supported by a shaft 55 (refer to FIG. 2) rotatably relative to the support plate 59 and the holder 205. The shaft 55 is supported at one end thereof by the support plate 59 located close to the cover 36, and at an opposite end thereof by the holder 205. The second reduction gear 49 includes a large-diameter large gear 56 and a small-diameter sun gear 57, which are formed integrally with each other. The large gear 56 is meshed with the non-reduction spur gear 48. The sun gear 57 is formed so as to axially extend from the large gear 56. The sun gear 57 is configured as a part of the planetary gear reduction mechanism 45, which will be described below. The second reduction gear 49 includes a hole 49A formed at a center thereof, and a shaft 58 is inserted therethrough. One end of the shaft 58 is fixedly press-fitted to the support plate 59 provided close to the cover 36. The second reduction gear 49 is rotatably supported by the shaft 58. Further, an annular stopper portion 56A is formed at an annular wall portion of the large gear 56 of the second reduction gear 49. The stopper portion 56A protrudes toward the planetary gear reduction mechanism 45 side.

The planetary gear reduction mechanism 45 includes the sun gear 57 of the second reduction gear 49, a plurality of planetary gears 60 (four gears in the present embodiment), an internal gear 61, and a carrier 62. Each of the planetary gears 60 includes a gear 63 and a hole portion 64. The gear 63 is meshed with the sun gear 57 of the second reduction gear 49. Pins 65 erected from the carrier 62 are rotatably inserted through the hole portions 64. The individual planetary gears 60 are laid out at even intervals along a circumference of the carrier 62. An annular plate 66 is disposed on an opposite end side of each of the planetary gears 60.

The carrier 62 is formed into a disk shape, and includes a polygonal hole 68 formed at a generally radially central position. An outer diameter of the carrier 62 is approximately equal to an outer diameter of a revolution locus of each of the planetary gears 60. A plurality of pin hole portions 69 is formed on an outer peripheral side of the carrier 62 at intervals along the circumferential direction. The pins 65 are fixedly press-fitted in the individual pin hole portions 69, respectively. The individual pins 65 are rotatably inserted through the hole portions 64 of the individual planetary gears 60, respectively. Then, the polygonal hole 68 of the carrier 62 and the polygonal shaft portion 81 of the base nut 75 of the rotation-linear motion conversion mechanism 43, which will be described below, are fitted to each other, which allows the carrier 62 and the base nut 75 to transmit a rotational torque to each other.

The internal gear 61 includes inner teeth 71, an annular wall portion 72, and a cylindrical wall portion 73. The gears 63 of the individual planetary gears 60 are meshed with the inner teeth 71, respectively. The annular wall portion 72 radially extends continuously from one end on a cover 36 side of these inner teeth 71 and regulates an axial displacement of each of the planetary gears 60. The cylindrical wall portion 73 extends from the inner teeth 71 toward the bottom wall 11 of the cylinder 15. The cylindrical wall portion 73 is inserted through an annular space between the inner annular wall portion 31B and the outer annular wall portion 31C of the first housing portion 31, by which the internal gear 61 is fixed to the housing 30. The annular plate 66 is disposed inside the internal gear 61. The annular plate 66 is sandwiched between an end surface of the inner teeth 71 of the internal gear 61 and the inner annular wall portion 31B of the first housing portion 31. As a result, each of the planetary gears 60 is disposed between the annular wall portion 72 and the annular plate 66 of the internal gear 61, by which an axial displacement thereof is regulated.

Further, a plurality of protruding portions 74 is provided in an outwardly protruding manner on an opposite end side of an outer peripheral surface of the internal gear 61 while being laid out at intervals in a circumferential direction. The individual protruding portions 74 are engaged with the individual engagement grooves 31D provided at the first housing portion 31, respectively. These individual protruding portions 74 are inserted and engaged in the individual engagement grooves 31D of the first housing portion 31, respectively, by which the internal gear 61 is non-rotatably supported in the first housing 31 so as to be prohibited from rotating. Further, the internal gear 61 is supported in the first housing portion 31 so as to be also prohibited from being axially displaced because an annular stopper portion 56A provided at the large gear 56 of the second reduction gear 49 is disposed on the cover 36 side of the annular wall portion 72 of the internal gear 61.

As illustrated in FIGS. 2 and 3, the motor 200 is supported by the holder 205 disposed on a flange portion 202 thereof. The holder 205 is formed by integrally connecting a motor support portion 206 and a ring-shaped support portion 207 to each other. The motor support portion 206 is configured to support the motor 200 while being disposed between the first reduction gear 47 and the non-reduction spur gear 48 and the flange portion 202 of the motor 200. The ring-shaped support portion 207 is disposed around the internal gear 61 of the planetary gear reduction mechanism 45 so as to surround the internal gear 61. A rotational shaft insertion hole 208 is formed at the motor support portion 206. The pinion gear 46 fixedly press-fitted to the rotational shaft 201 of the motor 200 is inserted through the rotational shaft insertion hole 208. Two terminal insertion holes are formed around the rotational shaft insertion hole 208. Individual motor terminals 203 of the motor 200 are inserted in the terminal insertion holes, respectively. The individual terminal insertion holes are formed on both radial sides of the rotational shaft insertion hole 28 as a pair of holes.

The motor support portion 206 of the holder 205 includes a holder-side first protruding portion 211, a holder-side second protruding portion 212, and a holder-side third protruding portion 213 each formed around the rotational shaft insertion hole 208 on an opposite side from the planetary gear reduction mechanism 45 side while being spaced apart from one another. These holder-side first protruding portion 211, holder-side second protruding portion 212, and holder-side third protruding portion 213 are each formed into a columnar shape, and are provided in a protruding manner toward the cover 36 side. Two fastening holes 216 are formed at the motor support portion 206. Individual attachment bolts 215 are fastened in the fastening holes 216 of the motor support portion 206 via individual through-holes 202A of the flange portion 202 of the motor 200, respectively. By this fastening, the motor 200 is supported on the motor support portion 206 of the holder 205. The ring-shaped support portion 207 is disposed above each of the protruding portions 74 so as to abut against an outer peripheral surface of the internal gear 61 of the planetary gear reduction mechanism 45.

The holder 205 includes two cylindrical support portions 217 and 217 integrally formed at intervals between the motor support portion 206 and the ring-shaped support portion 207. The support plate 59 is disposed on individual cylindrical support portions 217, and the individual attachment bolts 218 are fastened to the individual cylindrical support portions 217 of the holder 205 via the support plate 59, respectively, which allows the support plate 59 to be supported on the holder 205 while spaced apart therefrom.

A cover-side first cylindrical portion 221, a cover-side second protruding portion 222, and a cover-side third protruding portion 223 are each provided in a protruding manner on an inner surface of the cover 36 while being spaced apart from each other. These cover-side first cylindrical portion 221, cover-side second protruding portion 222, and cover-side third protruding portion 223 are formed at positions facing the holder-side first protruding portion 211, the holder-side second protruding portion 212, and the holder-side third protruding portion 213 provided at the holder 205, respectively. Then, a rubber 230, which is an elastic member, is interposed between the cover-side first cylindrical portion 221, the cover-side second protruding portion 222, and the cover-side third protruding portion 223 of the cover 36, and the holder-side first protruding portion 211, the holder-side second protruding portion 212, and the holder-side third protruding portion 213 of the holder 205.

The rubber 230 includes a first cup portion 231, a second cup portion 232, a third cup portion 233, and a plate-shaped base portion 234. The plate-shaped base portion 234 integrally connects ends of these first cup portion 231, second cup portion 232, and third cup portion 233 on opening sides thereof.

Then, the rubber 230 is unitized into the holder 205 by fitting the first cup portion 231 of the rubber 230 to the holder-side first protruding portion 211 of the holder 205, fitting the second cup portion 232 of the rubber 230 to the holder-side second protruding portion 212 of the holder 205, and fitting the third cup portion 233 of the rubber 230 to the holder-side third protruding portion 213 of the holder 205. After that, the cover-side first cylindrical portion 221 of the cover 36 is fitted to the first cup portion 231 of the rubber 230. Further, the cover-side second protruding portion 222 of the cover 36 is brought into abutment with the second cup portion 232 of the rubber 223, and the cover-side third protruding portion 223 of the cover 36 is further also brought into abutment with the third cup portion 233 of the rubber 230, which results in placement of the cover 36 over the holder 205. Harnesses 250 and 251 respectively extending from the individual motor terminals 203 of the motor 200 are disposed along a top of the base portion 234 of the rubber 230.

Further, as illustrated in FIG. 2, in the present embodiment, a plurality of kinds of rubbers 281, 282, and 283 different from the above-described rubber 230 is provided in the housing 30. A support portion 280 U-shaped in cross section is formed at an end of the holder 205 on a motor support portion 206 side thereof, and a rubber 281 U-shaped in cross section is integrally disposed inside that. The block-shaped rubbers 282 are disposed between positions on an outer peripheral surface of the ring-shaped support portion 207 of the holder 205 that are located close to the individual cylindrical support portions 217, and an inner wall surface of the first housing portion 31, respectively. The cylindrical rubber 283 is disposed between an end of the motor 200 on a main body side thereof and the bottom wall portion of the second housing portion 32.

In this manner, the motor 200, the multi-stage spur reduction mechanism 44, the planetary gear reduction mechanism 45, and the rubbers 230, 281, 282, and 283 are installed on the holder 205 and the support plate 59, by which the motor gear assembly 29 is constructed. The motor gear assembly 29 is mounted in a state hung in midair, i.e., a so-called floating state with respect to the housing 30 and the cover 36 due to the rubbers 230, 281, 282, and 283. In other words, the motor gear assembly 29 is fixed to the housing 30 and the cover 36 via the rubbers 230, 281, 282, and 283 without the holder 205 abutting against the housing 30 and the cover 36. The motor gear assembly 29 is fixed to the housing 30 and the cover 36 via the rubbers 230, 281, 282, and 283 in this manner, which can prevent or reduce transmission of a vibration generated in the motor 200, the multi-stage spur reduction mechanism 44, and the planetary gear reduction mechanism 45 to the housing 30 or the cover 36, thereby preventing or reducing generation of a noise accompanying the vibration.

In the present embodiment, the multi-stage spur reduction mechanism 44 and the planetary gear reduction mechanism 45 as the reduction mechanism for enhancing the driving force output from the motor 200 are employed to acquire a rotational force displacing the piston 18 forward. However, this reduction mechanism may be constructed with use of only the planetary gear reduction mechanism 45. Further, a reducer based on another known technique, such as a cycloid reduction mechanism and a harmonic reducer, may be combined with the planetary gear reduction mechanism 45.

As illustrated in FIGS. 1 to 3, the individual motor terminals 203 of the motor 200 and the individual connector terminals 255 provided in the second housing portion 32 are electrically connected to each other via the individual harnesses 250 and 251, which are wirings connecting them, respectively. A joining terminal 256, which is connected to the connector terminal 255, is provided at one end of each of the harnesses 250 and 251. Opposite ends of the individual harnesses 250 and 251 are connected to the individual motor terminals 203 of the motor 200, respectively. Now, each of the harnesses 250 and 251 in the present embodiment is made from a twisted wire formed by twisting thin metallic wires together, and is flexible.

As illustrated in FIGS. 4, and 5(a) and 5(b), the joining terminal 256 according to a first embodiment is formed into a plate-like shape as a whole expect for a fixation portion 262. The joining terminal 256 is formed so as to have a thinner thickness than the connector terminal 255. The joining terminal 256 mainly includes the fixation portion 262, the contact surface portion 263, biasing portions 264, protruding portions 265, and a welded portion 266. Each of the harnesses 250 (251) is fixed to the fixation portion 262. The fixation portion 262 is cylindrically formed with one end of the harness 250 (251) held inside this fixation portion 262. The contact surface portion 263 is formed so as to extend from the fixation portion 262, and closely contacts the flat plate surface 255B of the connector terminal 255 while facing it. The biasing portions 264 are each formed so as to extend from a side surface of the contact surface portion 263 to the wall-side flat surface 255A of the connector terminal 255, and is configured to exert a biasing force so as to bring the contact surface portion 263 into close contact with the flat plate portion 255B of the connector terminal 255. The protruding portions 265 are each formed so as to extend from a position spaced apart from the biasing portion 264, i.e., a position on the side surface of the contact surface portion 263 that is located at a distal end side with respect to the biasing portion 264, and are disposed in such a manner that end surfaces are in alignment with each other between an end 268A that is a distal end of the contact surface portion 263, and the end 258A of the connector terminal 255 on one side closer to the opening portion 30A of the housing 30, when being in abutment with the stepped surfaces 260 of the connector terminal 255. The welded portion 266 is formed so as to extend over the end 268A that is the distal end of the contact surface portion 263 and the end 258A of the connector terminal 255 on the one side closer to the opening portion 30A of the housing 30.

The contact surface portion 263 is formed into a plate-like shape, and extends from the fixation portion 262 toward the one side closer to the opening portion 30A of the housing 30 via a coupling portion 261 shaped like a crank as viewed in a side view (refer to FIGS. 5(a) and 5(b)). The coupling portion 261 includes a coupling portion formed thereon, which extends in a direction for separating the coupling portion farther away from the flat plat surface of the connector terminal as extending from the contact surface portion 263 toward the fixation portion 262. The contact surface portion 263 includes a narrow contact surface portion 268 and a wide contact surface portion 269, which are formed integrally with each other. The narrow contact surface portion 268 corresponds to the narrow portion 258 of the connector terminal 255. The wide contact surface portion 269 corresponds to the wide portion 259 of the connector terminal 255. The narrow contact surface portion 268 and the wide contact surface portion 269 are each formed into a generally rectangular shape as viewed from a front surface. In the above description, the front surface refers to the abutment surface between the connector terminal 255 and the joining terminal 256, and the shape as viewed from the front surface means the shape as viewed from the front surface of the connector terminal 255. Stepped portions 267 are formed between the narrow contact surface portion 268 and the wide contact surface portion 269 on both side surfaces of the contact surface portion 263, respectively. The biasing portions 264 are provided from side surfaces of the wide contact surface portion 269 toward the connector terminal 255 side.

In the present embodiment, the biasing portions 264 are constituted by the pair of biasing portions 264 and 264 extending from both the side surfaces 269A of the wide contact surface portion 269. This pair of biasing portions 264 and 264 is formed at positions of the wide contact surface portion 269 on the fixation portion 262 side. Each of the biasing portions 264 and 264 is formed into a generally L shape in cross section, including a plate-like pressing portion 271 extending in parallel with the contact surface portion 263 and a plate-shaped support portion 272 extending from the side surface 269A of the wide contact surface portion 269 in a direction orthogonal to the wide contact surface portion 269. The plate-shaped pressing portion 271 is formed into a generally rectangular shape as viewed from the front surface. The plate-shaped pressing portions 271 and 271 of the individual biasing portions 264 are disposed so as to be located close to each other with a space generated therebetween. On the other hand, the plate-shaped support portion 272 is formed into a generally rectangular shape as viewed from the side surface. The pair of plate-shaped support portions 272 and 272 is formed so as to sandwich both side surfaces 259A and 259A of the wide portion 259 of the connector terminal 255, i.e., extend while keeping an interval therebetween that is approximately equal in width to the wide portion 259 of the connector terminal 255. The biasing portions 264 configured in this manner allow the contact surface portion 263 to closely contact the flat plate surface 255B of the connector terminal 255.

The protruding portions 265 are each formed into a plate-like shape, and are formed by being folded from the both side surfaces 268A of the narrow contact surface portions 268 of the joining terminal 256 that are located close to the stepped portions 267 in a direction toward one side which corresponds to be the connector terminal 255 side orthogonally to the narrow contact surface portion 268. Each of the protruding portions 265 and 265 is formed into a generally rectangular shape as viewed from the side surface. The individual protruding portions 265 and 265 extend generally in parallel with the individual plate-shaped support portions 272 of the biasing portions 264 and 264, respectively. A length of the protrusion of each of the protruding portions 265 and 265 is set to a length corresponding to the thickness of the connector terminal 255. The individual protruding portions 265 and 265 are configured in such a manner that, when the wide portion 259 of the connector terminal 255 is inserted between the plate-shaped pressing portions 271 of the biasing portions 264 and the wide contact surface portion 269 of the joining terminal 256, side surfaces 265A and 265A, which are located on the wide contact surface portion 269 sides of the individual protruding portions 265 and 265, are brought into abutment with the individual stepped portions 260 and 260 of the connector terminal 255, respectively. In other words, the individual protruding portions 265 and 265 are in abutment with the individual stepped portions 260 and 260 of the connector terminal 255, respectively, by which the joining terminal 256 is positioned relative to the connector terminal 255. The individual protruding portions 265 and 265 are formed at positions that allow inner surfaces 265B and 265B, which serve as facing surfaces thereof, to face the side surfaces 258A and 258A of the narrow portion 258 of the connector terminal 255 with spaces generated therebetween, respectively.

Then, to connect the joining terminal 256 to the connector terminal 255, first, the individual protruding portions 265 of the joining terminal 256 are brought into abutment with the individual stepped portions 260 provided on the both side surfaces of the connector terminal 255, respectively, by inserting the connector terminal 255 into the joining terminal 256 from one side where the narrow portion 258 of the connector terminal 255 is located in such a manner that the wide portion 259 of the connector terminal 255 is sandwiched between the plate-shaped pressing portions 271 of the individual biasing portions 264 and the wide contact surface portion 269 of the joining terminal 256. When the connector terminal 255 is inserted into the joining terminal 256, the connector terminal 255 is guided into between the plate-shaped pressing portions 271 of the individual biasing portions 264 and the wide contact surface portion 269 of the joining terminal 256 along the guide tapered surface 258B provided at the narrow portion 258 of the connector terminal 255.

As a result, the wide portion 259 of the connector terminal 255 is sandwiched between the plate-shaped pressing portions 271 of the individual biasing portions 264 and the wide contact surface portion 269 of the joining terminal 256. As a result, the individual biasing portions 264 of this joining terminal 256 exert the biasing force so as to bring the wide portion 259 of the joining terminal 255 and the respective plate-shaped pressing portions 271 of the joining terminal 256 into close contact with each other. Further, the individual biasing portions 264 of the joining terminal 256 position the joining terminal 256 and the connector terminal 255 in a width direction and a thickness direction. Further, the individual protruding portions 265 of the joining terminal 256 allow the distal end of the connector terminal 255 and the distal end of the joining terminal 256 to be aligned with each other. In other words, the individual protruding portions 265 of the joining terminal 256 position the joining terminal 256 and the connector terminal 255 in an insertion direction, thereby allowing the end 258A of the narrow portion 258 of the connector terminal 255 on the one side closer to the opening portion 30A of the housing 30 and the end 268A of the narrow contact surface portion 268 of the joining terminal 256 on the one side closer to the opening portion 30A of the housing 30 to be aligned with each other.

The welded portion 266 is formed by welding the end 258A on the distal end side of the connector terminal 255 and the end 268A on the distal end side of the joining terminal 256 so as to cause the welding to extend over both of them. In other words, the welded portion 266 is formed by welding the end 258A of the narrow portion 258 of the connector terminal 255 on the one side closer to the opening portion 30A of the housing 30 and the end 268A of the narrow contact surface portion 268 of the joining terminal 256 on the one side closer to the opening portion 30A of the housing 30. In the present embodiment, the welded portion 266 is formed by joining them by TIG welding (tungsten inert gas welding). This results in placing the welded portion 266 of the joining terminal 256 at a position farthest away from the fixation portion 262. In this manner, forming the welded portion 266 extending over the connector terminal 255 and the joining terminal 256 can securely establish an electric connection by joining the connector terminal 255 and the joining terminal 256 to each other.

In the present embodiment, the harnesses 250 and 251 each made of a twisted wire formed by twisting thin metallic wires together are used as the wiring that connects the motor 200 and the connector terminal 255 to each other. However, a bus bar made of a metallic plate may be used as the wiring as long as this bus bar is flexible.

Figure 6:
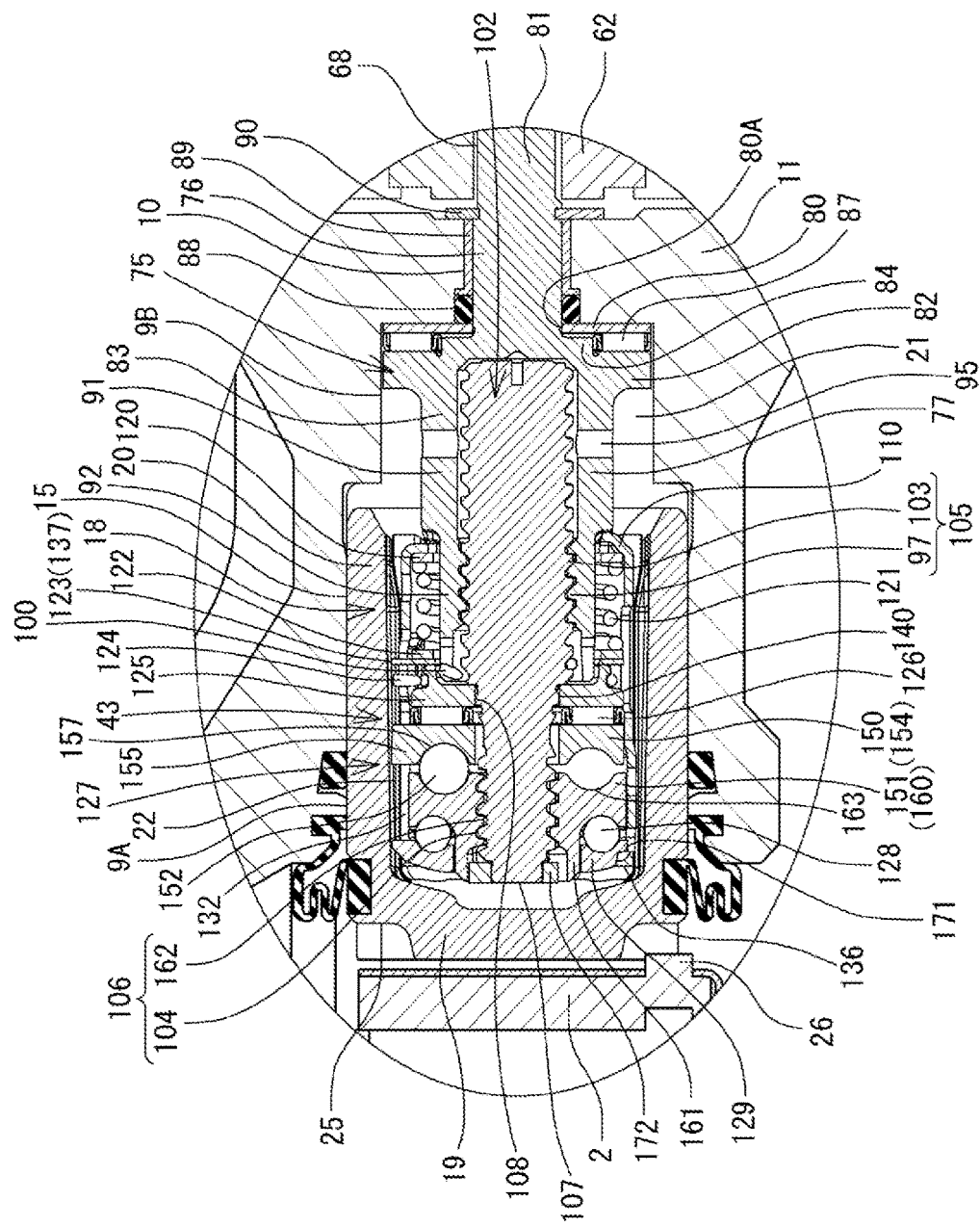
FIG. 6 is an enlarged cross-sectional view of a rotation-linear motion conversion mechanism.

Next, the rotation-linear motion conversion mechanism 43 will be specifically described with reference to FIGS. 1 to 6. In the following description, the rotation-linear motion conversion mechanism 43 will be described assuming that the right side and the left side in FIGS. 1 and 6 are one end side and an opposite end side, respectively, when necessary for convenience of the description.

The rotation-linear motion conversion mechanism 43 functions to convert the rotational motion from the multi-stage spur reduction mechanism 44 and the planetary gear reduction mechanism 45, i.e., the rotation of the motor 200 into a motion in a linear direction (hereinafter referred to as a linear motion for convenience) to provide a thrust force to the piston 18, and hold this piston 18 at the braking position. The rotation-linear motion conversion mechanism 43 includes the base nut 75, a push rod 102, and a ball and ramp mechanism 127. The base nut 75 is a rotatably supported rotation transmission member to which the rotational motion is transmitted from the multi-stage spur reduction mechanism 44 and the planetary gear reduction mechanism 45. The push rod 102 is a shaft member threadably fitted with a female screw portion 97 of the base nut 75 and supported so as to be able to rotate according to a rotation of the base nut 75 and be displaced linearly. The ball and ramp mechanism 127 is threadably fitted to the push rod 102 and provides an axial thrust force to the piston 18 according to the rotation of this push rod 102. The rotation-linear motion conversion mechanism 43 is contained between the cylinder 15 and the piston 18 in the caliper main body 6.

The base nut 75 includes a columnar portion 76 and a nut portion 77. The nut portion 77 is integrally provided at an opposite end of the columnar portion 76. A washer 80 is disposed at the bottom wall 11 of the cylinder 11 in abutment therewith. The columnar portion 76 of the base nut 75 is inserted through each of an insertion hole 80A of the washer 80 and the hole portion 10 provided at the bottom wall 11 of the cylinder 15. The polygonal shaft portion 81 is integrally connected at a distal end of the columnar portion 76. This polygonal shaft portion 81 is fitted in the polygonal hole 68 of the carrier 62 while being inserted through the attachment opening portion 31A of the first housing portion 31. The nut portion 77 of the base nut 75 is formed into a bottomed cylindrical shape. The nut portion 77 includes a circular wall portion 82 and a cylinder portion 83. The cylinder portion 83 is integrally provided in a protruding manner from an opposite end surface of the circular wall portion 82. An outer peripheral surface of the circular wall portion 82 is positioned close to an inner wall surface of the small-diameter opening portion 9B of the cylinder 15. A small-diameter circular wall portion 84 is provided in a protruding manner from a radially central portion of one end surface of the circular wall portion 82. The columnar portion 76 is provided in a protruding manner from one end surface of the small-diameter circular wall portion 84 toward one end side. The columnar portion 76 is formed so as to have a smaller outer diameter than an outer diameter of the cylindrical portion 83 of the nut portion 77.

A thrust bearing 87 is disposed between circular wall portion 82 and the washer 80 around the small-diameter circular wall portion 84 provided at the nut portion 77 of the base nut 75. Then, the base nut 75 is rotatably supported on the bottom wall 11 of the cylinder 15 via the thrust bearing 87. A seal member 88 and a sleeve 89 are each provided between an outer peripheral surface of the columnar portion 76 of the base nut 75 and the hole portion 10 of the bottom wall 11 of the cylinder 15. As a result, the liquid tightness in the hydraulic chamber 21 can be maintained. A stop ring 90 is loaded in an annular groove provided between the columnar portion 76 of the base nut 75 and the polygonal shaft portion 81, and a displacement of the base nut 75 in the axial direction of the cylinder 15 is regulate by the stop ring 90.

The cylindrical portion 83 of the nut portion 77 of the base nut 75 includes a large-diameter cylindrical portion 91 located on one end side thereof and a small-diameter cylindrical portion 92 located on an opposite end side thereof. One end of the large-diameter cylindrical portion 91 is integrally connected to the circular wall portion 82. A plurality of radially extending through-holes 95 is formed through a circumferential wall portion of the large-diameter cylindrical portion 91. The plurality of through-holes 95 is formed at intervals in a circumferential direction. The female screw portion 97 is formed on an inner peripheral surface of the small-diameter cylindrical portion 92 of the nut portion 77. A plurality of engagement grooves 98 is each formed on an opposite end surface of a circumferential wall portion of the small-diameter cylindrical portion 92 at intervals in the circumferential direction. In the present embodiment, the engagement grooves 98 are formed at four positions.

Further, as illustrated in FIG. 6, a distal end of a first spring clutch 100 is fitted in any of the individual engagement grooves 98 of the small-diameter cylindrical portion 92 of the base nut 75. The first spring clutch 100 provides a rotational resistance against a rotation in one direction. The first spring clutch 100 is constructed with use of a coil portion coiled once continuously from the distal end facing radially outwardly. Then, the distal end of the first spring clutch 100 is fitted in any of the individual engagement grooves 98 of the small-diameter cylindrical portion 92 of the base nut 75, and the coil portion is wound around an outer periphery on an opposite end side of a male screw portion 103 of the push rod 102, which will be described below. The first spring clutch 100 is configured to permit a rotation in a rotational direction when the push rod 102 is displaced relative to the base nut 75 toward one side where the bottom portion 19 of the piston 18 is located (a rotational direction when the brake is applied) while providing a torque resisting a rotation in a rotational direction when the push rod 102 is displaced relative to the base nut 75 toward another side where the bottom wall 11 of the cylinder 15 is located (a rotational direction when the brake is released).

One end side of the push rod 102 is inserted in the nut portion 77 of the base nut 75. The male screw portion 103 is formed at the one end side of the push rod 102. The male screw portion 103 is threadably fitted with the female screw portion 97 of the small-diameter cylindrical portion 92 of the base nut 75. A first threadable fitting portion 105 between the male screw portion 103 of the push rod 102 and the female screw portion 97 of the small-diameter cylindrical portion 92 of the base nut 75 is configured to have a backward efficiency of 0 or lower so as to prevent the base nut 75 from rotating due to an axial load from the piston 18 to the push rod 102, i.e., configured as a highly irreversible threadable fitting portion.

On the other hand, a male screw portion 104 is formed at an opposite end side of the push rod 102. The male screw portion 104 is threadably fitted with a female screw portion 162 provided at a rotation linear-motion ramp 151 of the ball and ramp mechanism 127, which will be described below. Similarly to the first threadable fitting portion 105, a second threadable fitting portion 106 between the male screw portion 104 of the push rod 102 and the female screw portion 162 provided at the rotation-linear motion ramp 151 is also configured to have a backward efficiency of 0 or lower so as to prevent the push rod 102 from rotating due to the axial load from the piston 18 to the rotation-linear motion ramp 151, i.e., configured as a highly irreversible threadable fitting portion The push rod 102 includes a spline shaft 108 provided between the male screw portion 103 on one end side thereof and the male screw portion 104 on an opposite end side thereof. The male screw portion 103 on the one end side is formed so as to have a larger outer diameter than an outer diameter of the male screw portion 104 on the opposite end side. The male screw portion 103 on the one end side is further formed so as to have a larger outer diameter than an outer diameter of the spline shaft 108. An opposite end surface of the male screw portion 104 of the push rod 102 faces the bottom portion 19 of the piston 18.

A retainer 110 is axially displaceably supported between an outer peripheral surface of the small-diameter cylindrical portion 92 of the cylinder portion 84 forming the nut portion 77 of the base nut 75 and an inner peripheral surface of the cylindrical portion 20 of the piston 18. The retainer 110 includes an annular wall portion 111 on one end side thereof, and is configured generally cylindrically as a whole. A plurality of through-holes is formed on an outer peripheral wall of the retainer 110.

A one-end-side washer 120, a coil spring 121, an opposite-end-side washer 122, a support plate 123, a second spring clutch 124, a rotational member 125, a thrust bearing 126, the ball and ramp mechanism 127, a thrust bearing 128, and an annular pressing plate 129 are disposed in the retainer 110 in this order from the one end side. The one-end-side washer 120 is disposed in abutment with an opposite end surface of the annular wall portion 111 of the retainer 110.

The coil spring 121 is interposed between the one-end-side washer 120 and the opposite-end-side washer 122. This coil spring 121 exerts a biasing force in a direction for separating the one-end-side washer 120 and the opposite-end-side washer 122 from each other. A plurality of engagement grooves 132 each having a predetermined depth is formed on an opposite end surface of a circumferential wall portion of the retainer 110 at intervals in a circumferential direction. In the present embodiment, the engagement grooves 132 are formed at three portions. A plurality of claw portions 136 is formed at the opposite end of the retainer 110. The claw portions 136 extend toward the bottom portion 19 of the piston 18. By folding each of the claw portions 136 toward a containing recessed portion 171 of the annular pressing plate 129, which will be described below, after containing the one-end-side washer 120, the coil spring 121, the opposite-end-side washer 122, the support plate 123, the second spring clutch 124, the rotational member 125, the thrust bearing 126, the ball and ramp mechanism 127, the thrust bearing 128, and the annular pressing plate 129 in the retainer 1120, the above-described components can be integrally disposed in the retainer 110 to be integrated into an assembly.

The annular support plate 123 is disposed on an opposite end surface of the opposite-end-side washer 122 in abutment therewith. A plurality of protruding pieces 137 is provided on an outer peripheral surface of the support late 123 at intervals along the circumferential direction. In the present embodiment, the protruding pieces 137 are formed at three portions. The individual protruding pieces 137 of this support plate 123 are fitted in the engagement grooves 132 of the retainer 110 and the rotation regulation vertical grooves 22 provided on the inner peripheral surface of the piston 18, respectively. As a result, the retainer 110 is supported so as to be prohibited from rotating and permitted to be axially displaced relative to the piston 18 together with the one-end-side washer 120, the coil spring 121, the opposite-end-side washer 122, and the support plate 123.

In the retainer 110, the rotational member 125 is rotatably supported at an opposite end side of the support plate 123. The rotational member 125 includes a large-diameter annular portion 141 and a small-diameter cylindrical portion 142. The large-diameter annular portion 141 includes a spline hole 140. The small-diameter cylindrical portion 142 is integrally provided in a protruding manner from one end surface of the large-diameter annular portion 141. One end of the small-diameter cylindrical portion 142 is in abutment with the opposite end surface of the support plate 123. The push rod 102 is inserted in the rotational member 125, and the spline hole 140 of the large-diameter annular portion 141 of the rotational member 125 and the spline shaft 108 of the push rod 102 are splined to each other. This allows the rotational member 125 and the push rod 102 to transmit a rotational torque to each other.

The second spring clutch 124 is wound around an outer peripheral surface of the small-diameter cylindrical portion 142 of the rotational member 125. The second spring clutch 124 provides a rotational resistance against a rotation in one direction. The second spring clutch 124 is constructed with use of a coil portion coiled once continuously from a radially outwardly facing distal end, similarly to the first spring clutch 100. Then, a distal end of the second spring clutch 124 is fitted in the engagement groove 132 of the retainer 110, and the coil portion is wound around the outer peripheral surface of the small-diameter cylindrical portion 142 of the rotational member 125. The second spring clutch 124 is configured to permit a rotation in a rotational direction when the rotational member 125 is displaced toward the other side where the bottom wall 11 of the cylinder 15 is located (the rotational direction when the brake is released) while providing a torque resisting a rotation in a rotational direction when the rotational member 125 (the push rod 102) is displaced relative to the retainer 110 toward the one side where the bottom portion 19 of the piston 18 is located (the rotational direction when the brake is applied).

The torque resisting the rotation that is provided from the second spring clutch 124 when the brake is applied is set so as to exceed the torque resisting the rotation at the first threadable fitting portion 105 between the male screw portion 103 of the push rod 102 and the female screw portion 97 of the base nut 75. The ball and ramp mechanism 127 is disposed at an opposite end side of the rotational member 125 via the thrust bearing 126. The rotational member 125 is supported rotatably relative to the ball and ramp mechanism 127 via the thrust bearing 126.

The ball and ramp mechanism 127 includes a fixation ramp 150, the rotation-linear motion ramp 151, and individual balls 152. The balls 152 are interposed between the fixation ramp 150 and the rotation-linear motion ramp 151. The fixation ramp 150 is disposed at the opposite end side of the rotational member 125 via the thrust bearing 126. The fixation ramp 150 includes a disk-shaped fixation plate 154 and a plurality of protruding portions 155. The plurality of protruding portions 155 is provided in a protruding manner at intervals along a circumferential direction from an outer peripheral surface of the fixation plate 154. An insertion hole 156 is formed at a radial center of the fixation plate 154. The push rod 102 is inserted through the insertion hole 156. The individual protruding portions 155 of the fixation ramp 150 are fitted in the individual engagement grooves 132 of the retainer 110, respectively, and are also fitted in the individual rotation regulation vertical grooves 22 provided on the inner peripheral surface of the piston 18, respectively, by which the fixation ramp 150 is supported so as to be prohibited from rotating and permitted to be axially displaced relative to the piston 18. A plurality of ball grooves 157, in particular, three ball grooves 157 in the present embodiment, are formed on an opposite end surface of the fixation plate 154. The ball grooves 157 each extend in a circular-arc manner at a predetermined inclination angle along the circumferential direction, and also each have a circular-arc shape in cross section in a radial direction.

The rotation-linear motion ramp 151 includes an annular rotation-linear motion plate 160 and a cylindrical portion 161. The cylindrical portion 161 is integrally provided in a protruding manner from a radially central portion of an opposite end surface of this rotation-linear motion plate 160. The female screw portion 162 is formed on an inner peripheral surface extending from the rotation-linear motion plate 160 to the cylindrical portion 161. The male screw portion 104 of the push rod 102 is threadably fitted in the female screw portion 162. A plurality of ball grooves 163, in particular, three ball grooves 163 in the present embodiment, are formed on a surface of the rotation-linear motion plate 160 that faces the fixation plate 154 of the fixation plate 150. The ball grooves 163 each extend in a circular-arc manner at a predetermined inclination angle along the circumferential direction, and also each have a circular-arc shape in cross section in the radial direction. Each of the ball grooves 157 of the fixation ramp 150 and each of the ball grooves 163 of the rotation-linear motion ramp 151 may be configured to be indented at some position of the inclination along the circumferential direction, and/or inclined differently from some position of the inclination.

The balls 152 are interposed between the individual ball grooves 163 of the rotation-linear motion ramp 151 (the rotation-linear motion plate 160) and the individual ball grooves 157 of the fixation ramp 150 (the fixation plate 154), respectively. Then, when a rotational torque is applied to the rotation-linear motion ramp 151, the individual balls 152 roll between the individual ball grooves 163 of the rotation-linear motion plate 160 and the individual ball grooves 157 of the fixation plate 154, which leads to a change in an axial relative distance between the rotation-linear motion plate 160 and the fixation plate 154 due to a rotational difference between the rotation-linear motion plate 160 and the fixation plate 154.

The annular pressing plate 129 is disposed at an opposite end surface of the rotation-linear motion plate 160 around the cylindrical portion 161 via the thrust bearing 128. A plurality of protruding portions 168 is provided in a protruding manner on an outer peripheral surface of the annular pressing plate 129 at intervals along a circumferential direction. The individual protruding portions 168 of the annular pressing plate 129 are fitted in the individual engagement grooves 132 of the retainer 110, respectively, and are also fitted in the individual rotation regulation vertical grooves 22 provided on the inner peripheral surface of the piston 18, respectively, by which the annular pressing plate 129 is supported so as to be prohibited from rotating and permitted to be axially displaced relative to the piston 18.

The rotation-linear motion ramp 151 of the ball and ramp mechanism 127 is rotatably supported by the annular pressing plate 129 via the thrust bearing 128. An opposite end surface of the annular pressing plate 129 abuts against the bottom portion 19 of the piston 18, thereby pressing the piston 18. The containing recessed portions 171 are each formed on the opposite end surface of the annular pressing plate 129 on an outer peripheral potion between the individual protruding portions 168. The individual containing recessed portions 171 contain the inwardly folded individual claw portions 136 of the retainer 110 therein, respectively. As illustrated in FIG. 6, a stopper member 172 is integrally fixed at a distal end of the male screw portion 104 of the push rod 102. The stopper member 172 is used to define a range of the relative rotation between the push rod 102 and the rotation-linear motion ramp 151 of the ball and ramp mechanism 127.

As illustrated in FIG. 1, an ECU 175 is electrically connected to the motor 200 via the connector portion 34. The ECU 175 is constructed with use of an electronic control apparatus that controls driving of the motor 200. A parking switch 176 is connected to the ECU 175. The parking switch 176 is operated to instruct the vehicle to activate or release the parking brake. Further, the ECU 175 can also activate the parking brake without relying on the operation on the parking switch 176 based on a signal from a not-illustrated vehicle side.

Next, a function of the disk brake 1 according to the present embodiment will be described.

First, a function when the disk brake 1 brakes the vehicle as a normal hydraulic brake according to an operation performed on a brake pedal (not illustrated) will be described.

When the brake pedal is pressed by a driver, a hydraulic pressure is supplied from the master cylinder into the hydraulic chamber 21 in the caliper 4 via a hydraulic circuit according to a force pressing the brake pedal (both the master cylinder and the hydraulic circuit are not illustrated in the drawings). This supply causes the piston 18 to be displaced forward (displaced to the left in FIG. 1) from an original position when the vehicle is not braked while elastically deforming the piston seal 16, thereby pressing the inner brake pad 2 against the disk rotor D. Then, the caliper main body 6 is displaced to the right in FIG. 1 relative to the bracket 5 due to a reaction force against the pressing force of the piston 18, thereby pressing the outer brake pad 3 attached to the claw portion 8 against the disk rotor D. As a result, the disk rotor D is sandwiched by the pair of inner and outer brake pads 2 and 3, which results in generation of a fiction force and thus application of a braking force to the vehicle.

Then, when the driver releases the brake pedal, the supply of the hydraulic pressure from the master cylinder is stopped, so that the hydraulic pressure in the hydraulic chamber 21 reduces. This reduction causes the piston 18 to be displaced backward to the original position due to a restorative force of the piston seal 16 from the elastic deformation, by which the braking force is released. When the displacement amount of the piston 18 increases according to wear of the inner and outer brake pads 2 and 3 to exceed a limit of the elastic deformation of the piston seal 16, a slip occurs between the piston 18 and the piston seal 16. The disk brake 1 is configured in such a manner that this slip causes a shift of the original position of the piston 18 relative to the caliper main body 6, thereby adjusting a pad clearance to a constant value.

Next, a function as the parking brake, which is one example of a function for maintaining a stopped state of the vehicle, will be described. First, when the parking switch 176 is operated from a state in which the parking brake is released to activate (apply) the parking brake, the ECU 175 drives the motor 200 to rotate the sun gear 57 of the planetary gear reduction mechanism 45 via the multi-stage spur reduction mechanism 44. According to this rotation of the sun gear 57, the carrier 62 rotates via each of the planetary gears 60. Then, the rotational torque from the carrier 62 is transmitted to the base nut 75.

Next, the torque resisting the rotation of the rotational member 125 (the push rod 102) relative to the retainer 110 (the piston 18) in the applying direction that is provided from the second spring clutch 124 is set so as to exceed the torque resisting the rotation at the first threadable fitting portion 105 between the push rod 102 and the base nut 75. As a result, the base nut 75 of the push rod 102 is permitted to be rotated in the applying direction by the first spring clutch 100. Therefore, while the first threadable fitting portion 105 relatively rotates, i.e., only the base nut 75 rotates in the applying direction due to the rotation of the base nut 75 in the applying direction, the push rod 120 is displaced forward toward one side where the bottom portion 19 of the piston 18 is located along the axial direction.

As a result, the individual components such as the one-end-side washer 120, the coil spring 121, the opposite-end-side washer 122, the support plate 123, the second spring clutch 124, the rotational member 125, the thrust bearing 126, the ball and ramp mechanism 127, the thrust bearing 128, and the annular pressing plate 129 contained in the retainer 110, including the retainer 110, are integrally displaced forward together with the push rod 102 toward the one side where the bottom portion 19 of the piston 18 is located along the axial direction. The forward displacements of these components bring the annular pressing plate 129 into abutment with the bottom portion 19 of the piston 18, which causes the piston 18 to be displaced forward and thus brings the one end surface of the bottom portion 19 of the piston 18 into abutment with the inner brake pad 2.

As the rotational driving of the motor 200 in the applying direction still continues, the piston 18 starts pressing the disk rotor D via the brake pads 2 and 3 due to the displacement of the push rod 102. Upon the start of the generation of this pressing force, next, the torque resisting the rotation at the first threadable fitting portion 105 between the push rod 102 and the base nut 75 increases due to an axial force serving as a reaction force against this pressing force, thereby exceeding the torque resisting the rotation that is provided from the second spring clutch 124. As a result, the push rod 102 starts rotating in the applying direction together with the rotational member 125 according to the rotation of the base nut 75. Then, since the torque resisting the rotation at the second threadable fitting portion 106 between the push rod 102 and the ball and ramp mechanism 127 also increases due to the reaction force generated from the pressing force on the disk rotor D, the rotational torque of the push rod 102 in the applying direction is transmitted to the rotation-linear motion ramp 151 of the ball and ramp mechanism 127 via the second threadable fitting portion 106.

Then, the rotation-linear motion ramp 151 and the fixation ramp 150 are separated from each other against the biasing force of the coil spring 121 due to the rolling motion of each of the balls 152 while the rotation-linear motion ramp 151 of the ball and ramp mechanism 127 is rotating in the applying direction, by which the annular pressing plate 129 further presses the bottom portion 19 of the piston 18. As a result, the force pressing the disk rotor D by the inner and outer brake pads 2 and 3 increases.

The disk brake 1 according to the present embodiment first causes the relative rotation of the first threadable fitting portion 105 between the push rod 102 and the base nut 75 to then cause the forward displacement of the push rod 102 and thus the forward displacement of the piston 18, thereby acquiring the pressing force applied to the disk rotor D. Therefore, the disk brake 1 according to the present embodiment can adjust the original position of the push rod 102 relative to the piston 18 that is changing according to the wear of the pair of inner and outer brake pads 2 and 3 over time, with the aid of the operation of the first threadable fitting portion 105.

Then, the ECU 175 drives the motor 200 until the pressing force applied from the pair of inner and outer brake pads 2 and 3 to the disk rotor D reaches a predetermined value, in particular, for example, a current value of the motor 200 reaches a predetermined value. After that, the ECU 175 stops the power supply to the motor 200 upon detecting that the pressing force applied to the disk rotor D reaches the predetermined value according to the fact that the current value of the motor 200 reaches the predetermined value. Then, the linear motion of the ball and ramp mechanism 127 according to the rotation of the rotation-linear motion ramp 151 is stopped.

Lastly, the piston 18 is held at the braking position although the reaction force against the pressing force from the disk rotor D is applied to the rotation-linear motion ramp 151, since the second threadable fitting portion 106 between the push rod 102 and the ball and ramp mechanism 127 is configured as the threadable fitting portion in which both the push rod 102 and the ball and ramp mechanism 127 are not reversibly operable and the first threadable fitting portion 105 between the push rod 102 and the base nut 75 is also configured as the threadable fitting portion in which both the push rod 102 and the base nut 757 are not reversibly operable, and furthermore, the torque resisting the rotation relative to the base nut 75 in the releasing direction is applied from the first spring clutch 100 on the push rod 102. As a result, the braking force is maintained, and the activation of the parking brake is completed.

Next, when the parking brake is ended (released), the motor 200 is rotationally driven by the ECU 175 in the releasing direction for separating the piston 18 from the disk rotor D based on an operation of releasing the parking brake that is performed on the parking switch 176. As a result, the multi-stage spur reduction mechanism 44 and the planetary gear reduction mechanism 45 are rotationally driven in the releasing direction for returning the piston 18, and this rotational driving in the releasing direction is transmitted to the base nut 75 via the carrier 62.

At this time, the reaction force against the pressing force from the disk rotor D is applied to the push rod 102. In other words, the push rod 102 is subject to the torque resisting the rotation at the second threadable fitting portion 106 between the push rod 102 and the ball and ramp mechanism 127, the torque resisting the rotation at the first threadable fitting portion 105 between the push rod 102 and the base nut 75, and the torque resisting the rotation of the push rod 102 relative to the base nut 75 in the releasing direction that is provided from the first spring clutch 100. Therefore, the torque for the rotation away from the base nut 75 in the releasing direction is transmitted to the push rod 102 (including the rotational member 125), and is also transmitted to the rotation-linear motion ramp 151 of the ball and ramp mechanism 127. As a result, the rotation-linear motion ramp 151 only rotates in the releasing direction, and returns to an initial position in the rotational direction.

Next, the reaction force applied to the push rod 102 reduces, and the torque resisting the rotation at the second threadable fitting portion 106 between the push rod 102 and the ball and ramp mechanism 127 falls below a rotational resistance acquired by adding the torque resisting the rotation at the first threadable fitting portion 105 between the push rod 102 and the base nut 75 to the torque resisting the rotation of the push rod 102 relative to the base nut 75 in the releasing direction that is provided from the first spring clutch 100. Then, only the second threadable fitting portion 106 relatively rotates, and the rotation-linear motion ramp 151 of the ball and ramp mechanism 127 is displaced toward the one side where the bottom wall 11 of the cylinder 15 is located (in the releasing direction) along the axial direction together with the retainer 110 to return to an initial position in the axial direction.

As the motor 200 is further rotationally driven in the releasing direction and the base nut 75 continues rotating in the releasing direction, after the rotation-linear motion ramp 151 of the ball and ramp mechanism 127 returns to the initial position in both the rotational direction and the axial direction, the threadably engaged position of the second threadable fitting portion 106 between the push rod 102 and the ball and ramp mechanism 127 returns to the initial position, and the push rod 102 stops rotating in the releasing direction. As the base nut 75 further continues rotating in the releasing direction, the push rod 102 is displaced backward toward the one side where the bottom wall 11 of the cylinder 15 is located (in the releasing direction) along the axial direction, against the torque resisting the rotation of the push rod 102 relative to the base nut 75 in the releasing direction that is provided from the first spring clutch 100. As a result, the individual components such as the one-end-side washer 120, the coil spring 121, the opposite-end-side washer 122, the support plate 123, the second spring clutch 124, the rotational member 125, the thrust bearing 126, the ball and ramp mechanism 127, the thrust bearing 128, and the annular pressing plate 129 contained in the retainer 110, including the retainer 110, are integrally displaced backward together with the push rod 102 toward the one side where the bottom wall 11 of the cylinder 15 is located (in the releasing direction) along the axial direction. Then, the piston 18 is displaced backward to the original position with the aid of the restorative force of the piston seal 16 from the elastic deformation, so that the braking force is completely released.

In this manner, the disk brake 1 according to the present embodiment can securely establish the electric connection between the connector terminal 255 and the joining terminal 256, since the joining terminal 256 fixed to the one end of the harness 250 (251) includes the welded portion 266 formed by welding the end 268A of the joining terminal 256 on the one side closer to the opening portion 30A of the housing 30 and the end 258A of the connector terminal 255 on the one side closer to the opening portion 30A of the housing 30. Further, the disk brake 1 according to the present embodiment can make it difficult to transmit the vibration of the harness 250 (251) from the fixation portion 262 to the welded portion 266, since the welded portion 266 is disposed at the position farthest away from the fixation portion 262.

Further, the welded portion 266 can be formed in a state extending over the connector terminal 255 and the joining terminal 256, since the joining terminal 256 according to the present embodiment includes the protruding portions 265 that position the joining terminal 256 and the connector terminal 255 in the insertion direction and allow the end 258A of the connector terminal 255 on the one side closer to the opening portion 30A of the housing 30 and the end 268A of the joining terminal 256 on the one side closer to the opening portion 30A of the housing 30 to be aligned with each other. Therefore, the connector terminal 255 and the joining terminal 256 can be securely joined to each other. Further, the disk brake 1 according to the present embodiment allows a reduction in a force applied in a direction for shearing the welded portion 266 (a direction for misaligning the connector terminal 255 and the joining terminal 256 from each other along the insertion direction) due to the vibration after the disk brake 1 is mounted on the vehicle, since the protruding portions 265 of the joining terminal 256 are in abutment with the individual stepped surfaces 260 provided on the both side surfaces of the connector terminal 255, respectively. As a result, the disk brake 1 according to the present embodiment can improve reliability regarding the connection structure between the connector terminal 255 and the joining terminal 256.

Further, the welded portion 266 can be formed with the joining terminal 256 in close contact with the connector terminal 255, since the joining terminal 256 according to the present embodiment includes the biasing portions 264 each formed so as to extend from the side surface of the contact surface portion 263 to the wall-side flat surface 255A of the connector terminal 255 and configured to bias the contact surface portion 263 so as to bring it in close contact with the flat plate portion 255B of the connector terminal 255. Therefore, the connector terminal 255 and the joining terminal 256 can be securely joined to each other. Further, the biasing portions 264 allow a reduction in a force applied in a direction for shearing the welded portion 266 (a direction for separating the connector terminal 255 and the contact surface portion 263 of the joining terminal 256 from each other) due to the vibration when the vehicle is running, with the disk brake 1 mounted on the vehicle. Further, when the connector terminal 255 is attached to the joining terminal 256, the pair of plate-shaped support portions 272 and 272 can facilitate the attachment by serving as guide portions therefor, since the pair of plate-shaped support portions 272 and 272 of the biasing portions 264 extend so as to sandwich the both side surfaces 259A and 259A of the wide portion 259 of the connector terminal 255. Furthermore, the pair of plate-shaped support portions 272 and 272 allows a reduction in a force applied in a direction for shearing the welded portion 266 (a direction for misaligning the connector terminal 255 and the joining terminal 256 from each other along a direction orthogonal to the insertion direction) due to the vibration after the disk brake 1 is mounted on the vehicle.

In this manner, according to the disk brake including the connector terminal 255 according to the present embodiment, electric power can be stably supplied to the motor 200 due to the joining terminal 256 including the protruding portions 265, the biasing portions 264, and the welded portion 266.

Now, in the above-described patent literature, PTL 1, the bus bar, which is a rigid member, is used for the wiring that connects the motor and the connector terminal. However, in the case where the motor gear assembly is configured to float from the housing so as to prevent or reduce the generation of the noise from the housing when the motor is activated, the bus bar as the rigid member fixed to the motor gear assembly cannot realize absorption of a displacement relative to the connector terminal, and this leads to use of the harness, which is flexible. However, the use of the flexible harness undesirably makes the positioning difficult when the connection terminal of the harness is connected to the connector terminal.

Therefore, the provision of the protruding portions 265, the biasing portions 264, and the welded portion 266, like the joining terminal 256 according to the present embodiment, facilitates the positioning when the connection terminal of the harness is connected to the connector terminal.

Next, other embodiments of the protruding portions 265 of the joining terminal 256 employed for the disk brake 1 according to the present embodiment will be described with reference to FIGS. 7 to 12.

Figure 7:
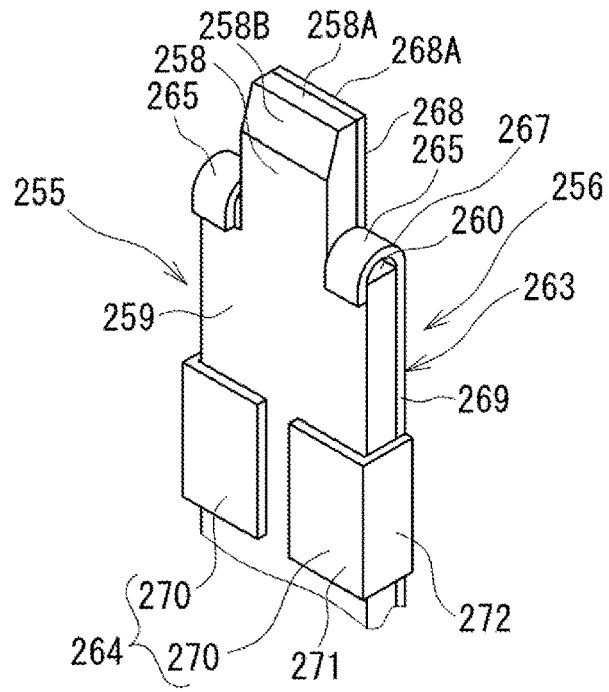
FIG. 7 is a perspective view illustrating a second embodiment of protruding portions of the joining terminal.
Figure 8:
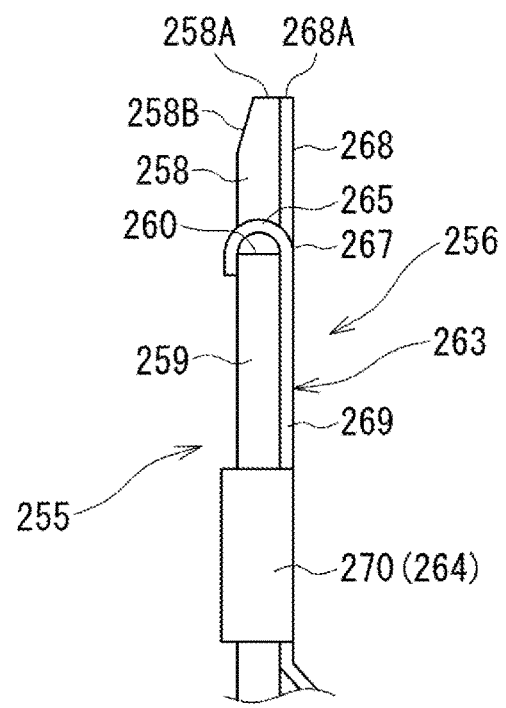
FIG. 8 is a side view of the second embodiment illustrated in FIG. 7.

According to a second embodiment illustrated in FIGS. 7 and 8, the individual protruding portions 265 of the joining terminal 256 are constructed as if being folded so as to each have an inverted U shape from entire regions of the individual stepped portions 267 between the narrow contact surface portion 268 and the wide contact surface portion 269 in the width direction toward the connector terminal 255 side on the both side surfaces of the contact surface portion 263, respectively. Attaching the joining terminal 256 to the connector terminal 255 results in abutment of the individual protruding portions 265 of the joining terminal 256 so as to cover the individual stepped surfaces 260 of the connector terminal 255, respectively.

Figure 9:
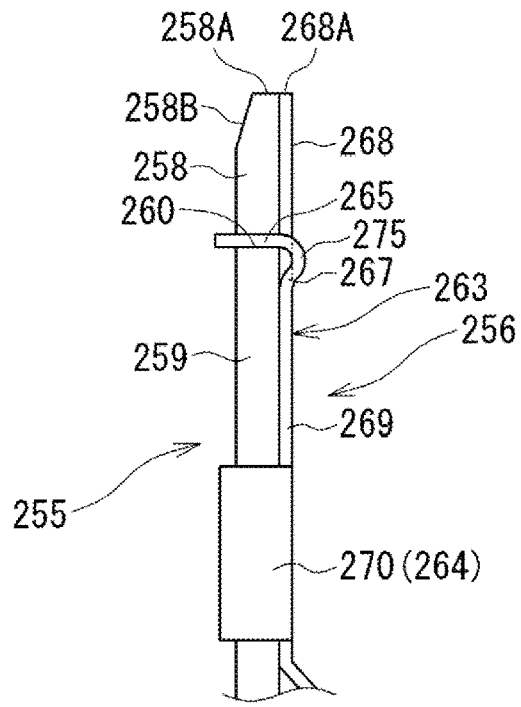
FIG. 9 is a side view illustrating a third embodiment of the protruding portions of the joining terminal.

According to a third embodiment illustrated in FIG. 9, the individual protruding portions 265 of the connector terminal 255 extend in a direction approximately orthogonal to the contact surface portion 263 via curved portions 275 from entire regions of the individual stepped portions 267 between the narrow contact surface portion 268 and the wide contact surface portion 269 in the width direction toward the connector terminal 255 side on the both side surfaces of the contact surface portion 263, respectively. The length of the protrusion of each of the protruding portions 265 is set to a slightly longer length than the thickness of the connector terminal 255.

Figure 10:
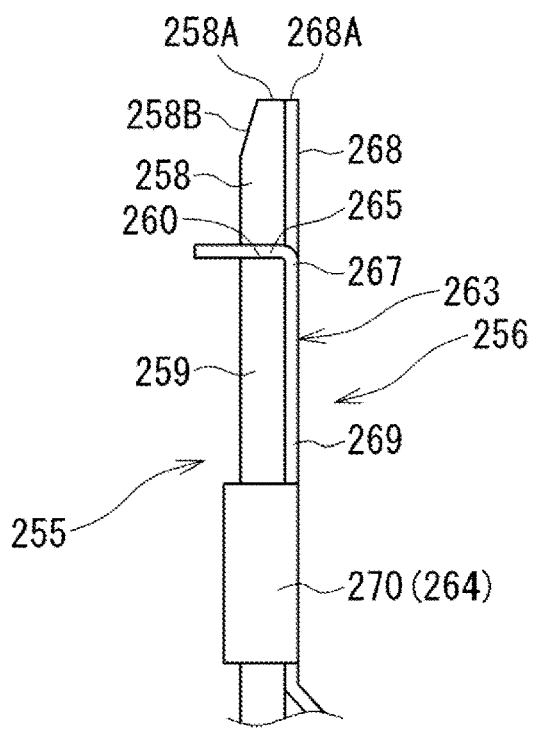
FIG. 10 is a side view illustrating a fourth embodiment of the protruding portions of the joining terminal.

A fourth embodiment illustrated in FIG. 10 is an embodiment in which the curved portions 275 formed in the third embodiment illustrated in FIG. 9 are removed therefrom.

Figure 11:
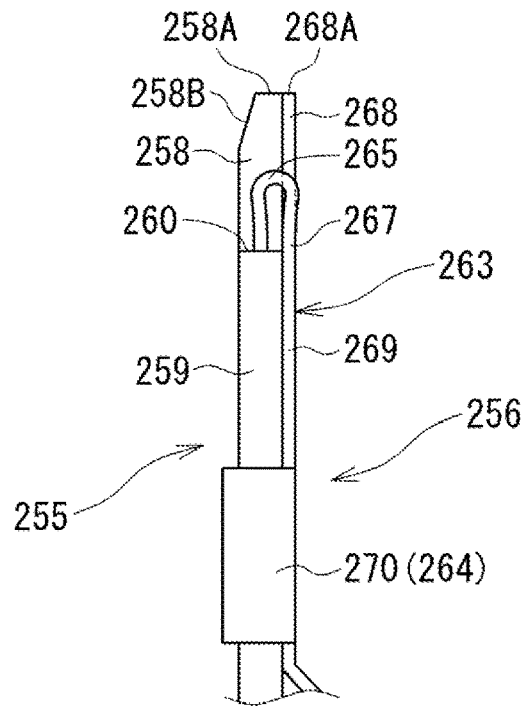
FIG. 11 is a side view illustrating a fifth embodiment of the protruding portions of the joining terminal.

A fifth embodiment illustrated in FIG. 11 is similar to the embodiments illustrated in FIGS. 7 and 8, and the individual protruding portions 265 of the joining terminal 256 are constructed as if being folded so as to each have an inverted U shape from the entire regions of the individual stepped portions 267 between the narrow contact surface portion 268 and the wide contact surface portion 269 in the width direction toward the connector terminal 255 side on the both side surfaces of the contact surface portion 263, respectively. In the present embodiment, attaching the joining terminal 256 to the connector terminal 255 results in abutment of the distal ends of the individual protruding portions 265 against the individual stepped surfaces 260 of the connector terminal 255, respectively.

Figure 12:
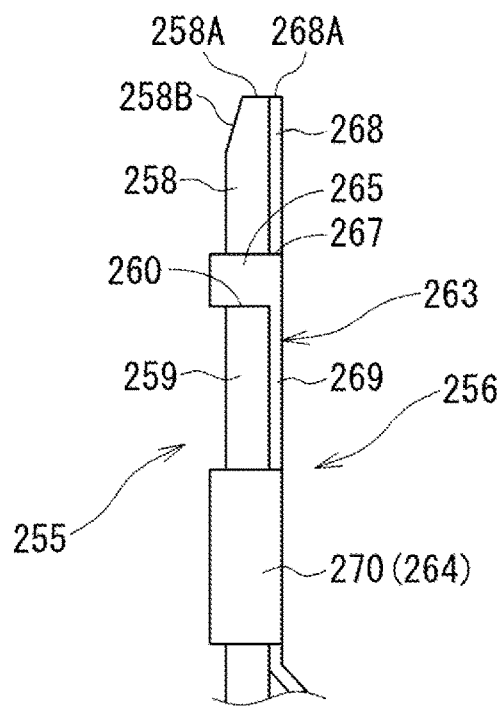
FIG. 12 is a side view illustrating a sixth embodiment of the protruding portions of the joining terminal.

According to a sixth embodiment illustrated in FIG. 12, the individual protruding portions 265 of the joining terminal 256 are constructed by being folded as if extending orthogonally to the wide contact surface portion 269 from the both side surfaces of the wide contact surface portion 269 of the joining terminal 256 toward the connector terminal 255 side, respectively. These individual protruding portions 265 are disposed close to the individual stepped portions 267, respectively. The individual protruding portions 265 extend generally in parallel with the plate-shaped support portions 272 of the individual biasing portion 264, respectively (refer to FIG. 4). In this fifth embodiment, the length of the protrusion of each of the protruding portions 265 is set to a slightly longer length than the thickness of the connector terminal 255.

Having described merely several embodiments of the present invention, those skilled in the art will be able to easily understand that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

The present application claims priority under the Paris Convention to Japanese Patent Application No. 2014-265016 filed on Dec. 26, 2014. The entire disclosure of Japanese Patent Application No. 2014-265016 filed on Dec. 26, 2014 including the specification, the claims, the drawings, and the abstract is incorporated herein by reference in its entirety.

REFERENCE SIGNS LIST 1 disk brake
4 caliper
6 caliper main body
18 piston
30 housing
30A opening portion
43 rotation-linear motion conversion mechanism
200 motor
255 connector terminal
255B flat plate surface
256 joining terminal
250, 251 harness
258A end (connector terminal side)
260 stepped portion
262 fixation portion
263 contact surface portion
264 biasing portion
265 protruding portion
266 welded portion
268A end (joining terminal side)

The invention claimed is:

1. A disk brake comprising:
a motor configured to activate a rotation-linear motion conversion mechanism contained in a caliper to displace a piston; and
a housing attached to the caliper and containing the motor therein, the housing also including an opening portion closed by a cover member,
wherein a distal end of a connector terminal is disposed in the housing, the connector terminal having a flat plate surface and including the distal end that extends from the motor toward the opening portion,
wherein a wiring that connects this connector terminal and the motor is provided,
wherein a joining terminal joined to the connector terminal is provided at one end of the wiring, and
wherein this joining terminal includes
a fixation portion to which the one end of the wiring is fixed,
a contact surface portion that extends from this fixation portion and that faces the flat plate surface of the connector terminal,
a biasing portion that extends from a side of the contact surface portion to a back surface of the flat plate surface of the connector terminal, the biasing portion being configured to bias the contact surface portion toward this flat surface portion so as to bring the contact surface portion into close contact with the flat plate surface of the connector terminal,
a protruding portion provided at a position of the contact surface portion that is separated from this biasing portion, the protruding portion being disposed in such a manner that an end of the opening portion side of the connector terminal and an end of the opening portion side of the contact surface portion are in alignment with each other when the protruding portion is in abutment with the connector terminal, and
a welded portion formed so as to extend over the end of the opening portion side of the connector terminal and the end of the opening portion side of the contact surface portion,
wherein the protruding portion is disposed at a distal end side of the connector terminal with respect to the biasing portion.

2. The disk brake according to claim 1, wherein the connector terminal includes first and second side surfaces, and
wherein the biasing portion extends so as to sandwich the first and second side surfaces of the connector terminal to form a pair of biasing portions.

3. The disk brake according to claim 1, wherein the connector terminal includes first and second side surfaces, and
wherein the biasing portion includes a pair of support portions that extend from the contact surface portion so as to sandwich the first and second side surfaces of the connector terminal.

4. The disk brake according to claim 3, wherein the biasing portion includes pressing portions respectively that extend from the pair of support portions so as to approach each other.

5. The disk brake according to claim 1, wherein the welded portion is formed at a position farthest away from the fixation portion.

6. The disk brake according to claim 1, wherein the welded portion is positioned opposite from the fixation portion with respect to the biasing portion.

7. The disk brake according to claim 1, wherein a coupling portion is formed between the contact surface portion and the fixation portion, the coupling portion extending in a direction for separating the coupling portion away from the flat plate portion of the connector terminal as extending from the contact surface portion toward the fixation portion.

8. A disk brake comprising:
a motor configured to activate a rotation-linear motion conversion mechanism contained in a caliper to displace a piston; and
a housing attached to the caliper and containing the motor therein, the housing also including an opening portion closed by a cover member,
wherein a distal end of a connector terminal is disposed in the housing, the connector terminal having a flat plate surface and including the distal end that extends from the motor toward the opening portion,
wherein a wiring that connects this connector terminal and the motor is provided,
wherein a joining terminal joined to the connector terminal is provided at one end of the wiring, and
wherein this joining terminal includes
a fixation portion to which the one end of the wiring is fixed,
a contact surface portion that extends from this fixation portion and that faces the flat plate surface of the connector terminal, a biasing portion that extends from a side of the contact surface portion to a back surface of the flat plate surface of the connector terminal, the biasing portion being configured to bias the contact surface portion toward this flat surface portion so as to bring the contact surface portion into close contact with the flat plate surface of the connector terminal, a protruding portion provided at a position of the contact surface portion that is separated from this biasing portion, the protruding portion being disposed in such a manner that an end of the opening portion side of the connector terminal and an end of the opening portion side of the contact surface portion are in alignment with each other when the protruding portion is in abutment with the connector terminal, and a welded portion formed so as to extend over the end of the opening portion side of the connector terminal and the end of the opening portion side of the contact surface portion, wherein the connector terminal includes a side surface, and wherein the protruding portion is formed at a position facing the side surface of the connector terminal with a space generated therebetween.

* * * * *